(12) United States Patent
Kopasz et al.

(10) Patent No.: US 9,317,714 B2
(45) Date of Patent: *Apr. 19, 2016

(54) STORING USER DATA IN A SERVICE PROVIDER CLOUD WITHOUT EXPOSING USER-SPECIFIC SECRETS TO THE SERVICE PROVIDER

(71) Applicant: LogMeIn, Inc., Boston, MA (US)

(72) Inventors: Krisztian Kopasz, Budapest (HU); Marton B. Anka, Windham, NH (US)

(73) Assignee: LogMeIn, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,078

(22) Filed: Jul. 21, 2014

(65) Prior Publication Data

US 2015/0169899 A1    Jun. 18, 2015

Related U.S. Application Data

(63) Continuation of application No. 13/284,223, filed on Oct. 28, 2011, now Pat. No. 8,788,843.

(51) Int. Cl.
*H04L 29/06* (2006.01)
*G06F 21/62* (2013.01)

(52) U.S. Cl.
CPC .................. *G06F 21/6245* (2013.01)

(58) Field of Classification Search
CPC ............... G06F 21/6218; G06F 2221/2107; G06F 21/6209; G06F 21/6227; H04L 63/0428
USPC ....................................................... 713/165
See application file for complete search history.

(56) References Cited

U.S. PATENT DOCUMENTS

2008/0083036 A1* 4/2008 Ozzie et al. ................. 726/27
2010/0313039 A1* 12/2010 Ignatius et al. ............. 713/189

\* cited by examiner

*Primary Examiner* — Ali Abyaneh
*Assistant Examiner* — Stephen Sanders
(74) *Attorney, Agent, or Firm* — David H. Judson

(57) ABSTRACT

Subscriber (user) data is encrypted and stored in a service provider cloud in a manner such that the service provider is unable to decrypt and, as a consequence, to view, access or copy the data. Only the user knows a user-specific secret (e.g., a password) that is the basis of the encryption. The techniques herein enable the user to share his or her data, privately or publicly, without exposing the user-specific secret with anyone or any entity (such as the service provider).

9 Claims, 6 Drawing Sheets

STORING USER DATA IN A SERVICE PROVIDER CLOUD WITHOUT EXPOSING USER-SPECIFIC SECRETS TO THE SERVICE PROVIDER

BACKGROUND

1. Technical Field

This disclosure relates generally to encrypting and storing subscriber data in a cloud storage environment in such a manner that a service provider is restricted from decrypting and, as a consequence, from accessing, viewing or copying, that data.

2. Background of the Related Art

Remote access technologies, products and systems enable a user of a remote computer to access and control a host computer over a network. Internet-accessible architectures that provide their users with remote access capabilities (e.g., remote control, file transfer, display screen sharing, chat, computer management and the like) also are well-known in the prior art. Typically, these architectures are implemented as a Web-based "service," such as LogMeIn, GoToMyPC, WebEx, Adobe Connect, Dropbox, and others. An individual (or subscriber) who uses the service has a host computer that he or she desires to access from a remote location. Using the LogMeIn service, for example, the individual can access his or her host computer using a client computer that runs web browser software.

An emerging information technology (IT) delivery model is cloud computing, by which shared resources, software and information are provided over the Internet to computers and other devices on-demand. With this approach, an application instance can be hosted and made available from Internet-based resources that are accessible over HTTP through a conventional Web browser. An example application is encrypted data storage.

BRIEF SUMMARY

Subscriber (user) data is encrypted and stored in a service provider cloud in a manner such that the service provider is unable to decrypt and, as a consequence, to view, access or copy the data. Only the user knows a user-specific secret (e.g., a password) that is the basis of the encryption. The techniques herein enable the user to share his or her data, privately or publicly, without exposing the user-specific secret with anyone that is not an intended recipient of the data (such as the service provider). The technique provides significant advantages because the end user password is never stored by the service provider persistently; thus, the service provider cannot access the user's data on its own. Using the described scheme, only upon receipt of the user password it is possible to decrypt and obtain an actual data key that is used (in the first instance) to encrypt the data itself. The data is not available in the clear in the service provider environment, and additional mechanisms may be provided to facilitate sharing (both private and public) while still maintaining the described security paradigm.

In an embodiment, the user data is encrypted with a data key, such as a symmetric AES key. Any person or entity that possesses this data key can decrypt the customer data. Using the described technique, the data key is hidden from unauthorized entities, which entities include the service provider itself. To facilitate this goal, and as a further layer of protection, each user is assigned a public/private key pair, referred to as an account public key and its associated account secret key. RSA is a representative public/private key pair. The account public key is stored in a central database and is used to encrypt the data key that encrypts the user data. The result of this encryption can only be decrypted with the account secret key. According to the protection scheme, the account private key is encrypted with the user-specific secret. Thus, if the user wants to access the data, his or her user-specific secret (e.g., the password) must be entered; as a result, the account secret key is obtained. The account secret key is then used to decrypt the data key that decrypts the user data itself. This approach also facilitates sharing of the user data (with a person or entity authorized by the user) in a secure manner.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
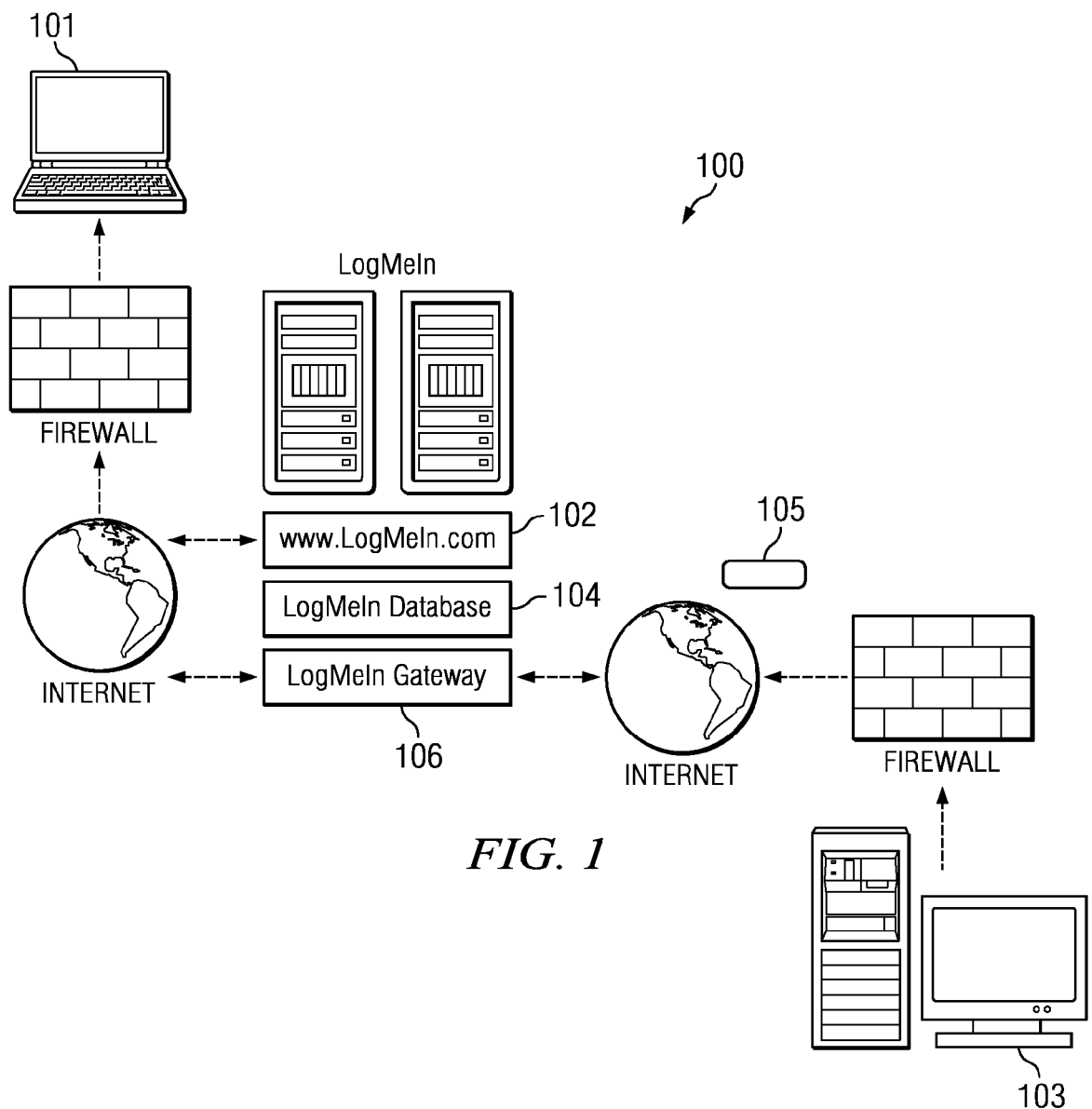
FIG. 1 depicts an extensible Web-based remote access architecture in which exemplary aspects of the file transfer method may be implemented.

By way of background, FIG. 1 illustrates a high level view of a remote access architecture 100 in which the disclosed technique may be practiced. This architecture is merely representative, and it should not be taken as limiting. Preferably, the architecture comprises "n-tiers" that include a web server tier 102, a database tier 104, and a gateway tier 106. The web server tier 102 comprises a plurality of machines that each executes web server software. The web server tier provides an Internet-accessible web site. Preferably, the web site associated with a site domain (however designated) is available from multiple locations that collectively comprise the web server tier 102. The database tier 104 comprises a plurality of machines that each executes database server software. The database tier provides a network-accessible data storage service for generating and storing data associated with end user sessions to the remote access service. The gateway tier 106 comprises a plurality of machines that each executes application server software. The gateway tier provides a network-accessible connection service for establishing and maintaining connections between and among the participating end user computers. Although not shown, preferably end user machines connect to the gateway servers over secure connections, e.g., over SSL, TLS, or the like. A representative machine on which the web server, database server or gateway server executes comprises commodity hardware (e.g., one or more processors) running an operating system kernel, applications, and utilities. Typically, the tiers are managed and operated by a commercial service provider, such as LogMeIn®, of Woburn, Mass. The service provider may have additional cloud-based infrastructure, such as cloud storage, but this is not required. Cloud storage may be provided by a third party entity. The service provider has an associated central database in which cryptographic keys and associated data may be stored.

As also seen in FIG. 1, the "user" of the remote access service typically has at least two (2) distinct machines associated therewith. A first machine, referred to as a "host" 103, is a machine that has resources (e.g., services, applications, files, or the like) that are desired to be accessed remotely from a second machine, referred to as the "client" 101. The host, which is Internet-accessible, includes a remote access "host" application. The host has an associated cryptographic data store, which is a secure (protected) data store for storing cryptographic materials such as keys and associated data. The client machine also is an Internet-accessible machine that typically includes a web browser or similar rendering engine. A representative machine is a laptop computer, or a mobile device, such as a smartphone or tablet (e.g., the iPhone® or iPad®). Generalizing, the mobile device is any wireless client device, e.g., a cellphone, pager, a personal digital assistant (PDA, e.g., with 3G or higher NIC), a mobile computer with a smartphone client, or the like. Other mobile devices include any access protocol-enabled device (e.g., a Blackberry® device, an Android™-based device, or the like) that is capable of sending and receiving data in a wireless manner. The first machine includes a remote access client application. In the case of a mobile device, the remote access client application may be LogMeIn Ignition™. The client application may be downloaded and installed via a mobile application delivery service, such as the Apple® App™ Store.

As used herein, the following terms have the following meanings:

A "user_password" is a user-specific secret (or "password") of an authorized user's account. A goal of the technique herein is that this secret is only known by the authorized user and remains unknown to the service provider. As will be seen, this "user password" is used to encrypt and decrypt the account secret key.

The "user_data" is content (or, more generally, data) that the authorized user desires to be encrypted and stored in the service provider's cloud storage.

The "aes_data_key" is a cryptographic key, such as a 256-bit symmetric AES key, that is used to encrypt the user_data desired to be encrypted and stored in the cloud storage.

The "enc_file" is a file generated by encrypting, with the aes_data_key, the user_data. Thus, enc_file results from an encryption function, designated herein by the following: encrypt (user_data, aes_data_key). This is the encrypted "file" as it is stored in the cloud storage.

An account of an authorized user has a key pair associated therewith. Preferably, the key pair is generated using a public key cryptographic protocol such as RSA. The public key of the RSA public/private key pair is designated herein as rsa_pub_acc_key, and the associated private (or "secret") key is designated herein as rsa_priv_acc_key. The public key is the "account public key" and the private key is its associated "account secret key." Typically, the account public key is stored in the cloud service provider central database, as well as in the host cryptographic data store. The account secret key is stored in the host cryptographic data store.

As will be seen, and according to the disclosed technique, the account secret key for the authorized user is encrypted with the authorized user's user-specific secret (password), i.e., encrypt (rsa_priv_key, PBKDF (user_password)), with the result being a "value" enc_acc_key that is preferably stored in the service provider central database.

The data key aes_data_key is encrypted with the account public key rsa_pub_acc_key as follows: rsa_encrypt (aes_data_key, rsa_pub_acc_key). The resulting "account encrypted data key" preferably is stored in the service provider central database, and in the host cryptographic data store.

The pub_enc_data_key is the data key aes_data_key encrypted with a token associated with a public link, as rsa_encrypt (aes_data_key, PubliLinkToken), and it is stored in the service provider central database.

Figure 2:
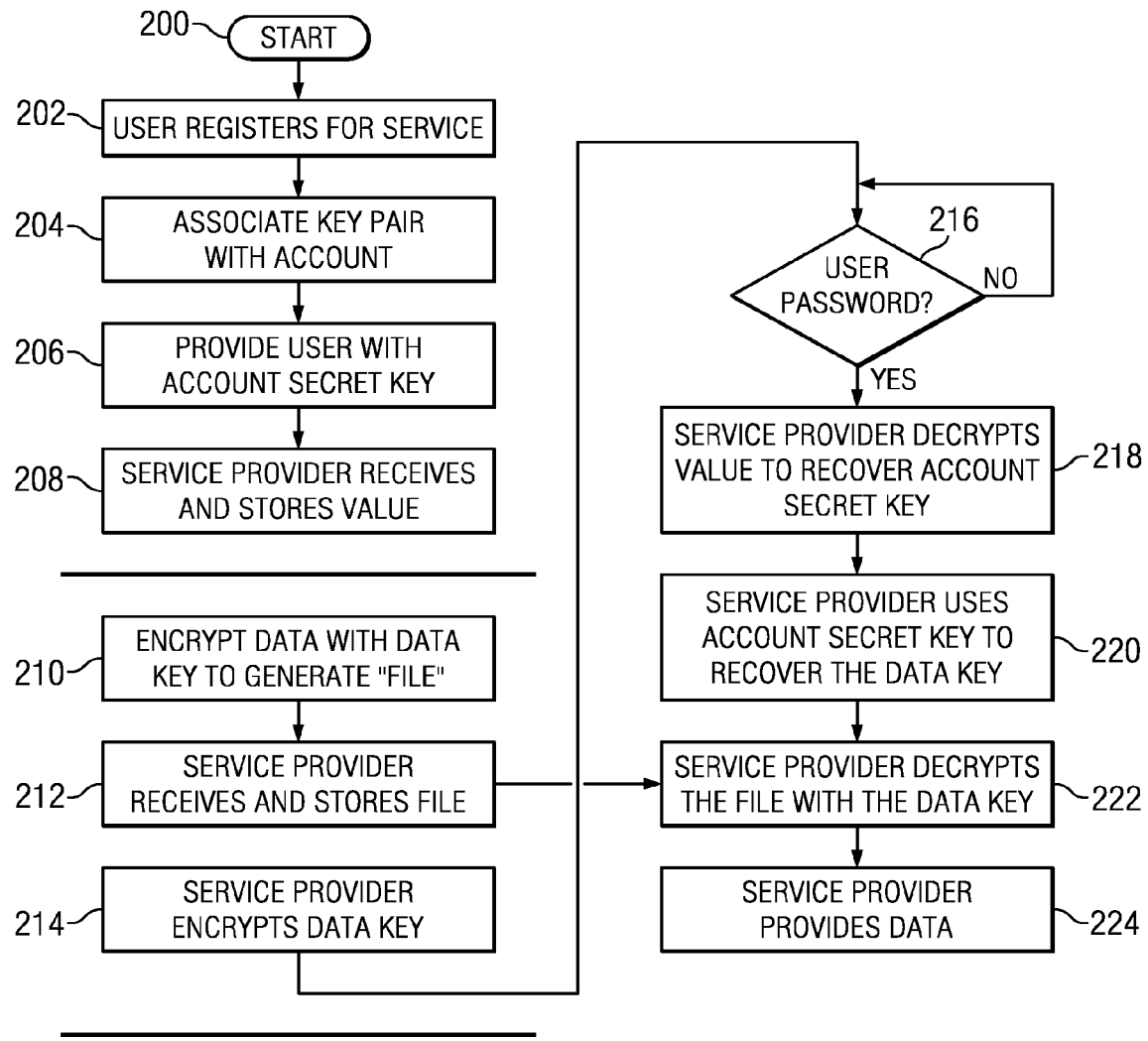
FIG. 2 is a process flow illustrating a method of storing and protecting user data in a service provider cloud according to this disclosure.

FIG. 2 illustrates a process flow of a method of storing and protecting user data in a service provider cloud of this disclosure. The service provider may be a standalone commercial service provider (such as LogMeIn, or the like), or any other cloud-based environment, such as an environment created from existing IT infrastructures that are adapted to support cloud-based services. In general, a representative cloud computing environment comprises a set of front-end administrative and operational support functions, together with a set of back-end computational resources. Typically, the cloud compute resources comprise a set of virtual machine instances (which are used to execute a target application that is being made available for access via the cloud), data stores, and associated support services. In an alternative embodiment, the subscriber stores data on one or more machines that are owned or controlled by the subscriber.

The process begins at step 200. The end user registers to the service at step 202 and, as an authorized user, obtains an account. Thereafter, at step 204, a key pair is associated with the account of the authorized user. The key pair comprises an account public key, and an associated account secret key. Preferably, the key pair is an RSA public/private key pair, although this is not a limitation. At step 206, the authorized user is provided the account secret key. Preferably, the communication of the account secret key to the end user occurs over a secure transport channel (e.g., an SSL link). This is not a limitation, as the account secret key may be provided via other means, such as e-mail, instant message, text message, or the like. At step 208, the service provider receives and stores a "value" that has been generated (within the context of the end user machine) by encrypting the account secret key with a user-specific secret. The user-specific secret is known only to the end user. This completes the basic provisioning operations that are necessary to facilitate described security method.

The process then continues with securing and storing the end user data (or content). In particular, at step 210, data (desired to be protected) associated with the authorized user is encrypted with a data key to produce a "file." This operation takes place in association with or at the end user machine. At step 212, the file (that has been generated by encrypting with the data key data associated with the authorized user) is received and stored in the service provider cloud. The service provider also receives the data key. At step 214, the service provider encrypts the data key (received at step 212) with the account public key to generate an account encrypted data key, which the service provider then stores. This completes the storage operations.

To provide access to the data, the process continues. In particular, a test is performed at step 216 to determine whether the user-specific secret has been entered (and received). If not, the routine cycles. If, however, the outcome of the test at step 216 indicates receipt of the user-specific secret, the routine continues. At step 218, the service provider decrypts the value (received at step 208) to recover the account secret key. At step 220, the service provider then uses the account secret key (which it just recovered) to decrypt the account encrypted data key (which was generated at step 214) to recover the data key itself. At step 222, the service provider then decrypts the file (which had been received at step 212) stored in the service provider cloud with the (just recovered) data key. Once the file is decrypted, the "data" is then provided at step 224. This completes the process.

Thus, the described technique enables user data to be stored (as an encrypted "file") in a service provider cloud without exposing the user-specific secret to the service provider.

Figure 3:
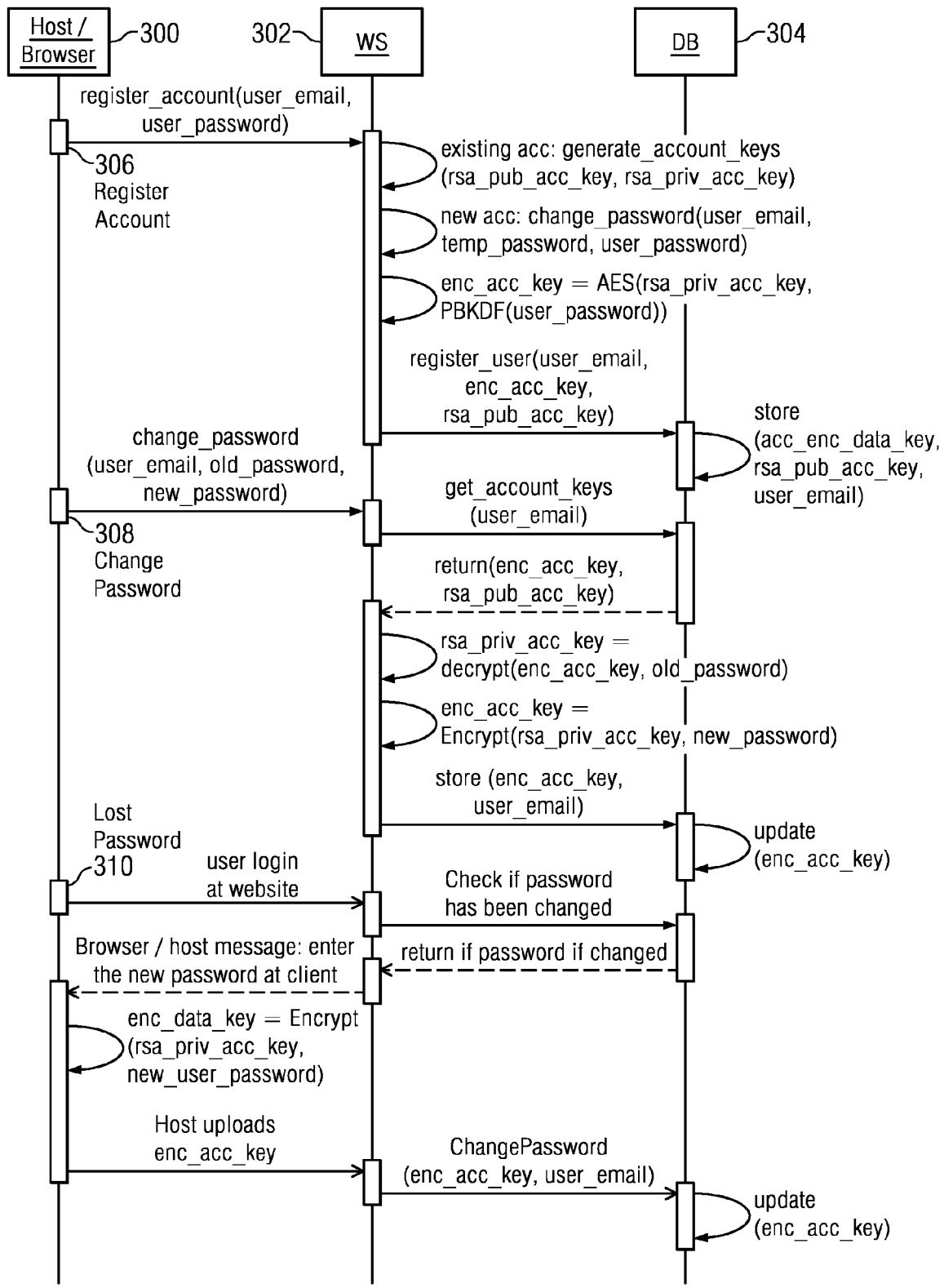
FIG. 3 depicts a UML interaction diagram for end user account management to the service provider cloud.

FIG. 3 is a UML interaction diagram illustrating representative interactions among a host browser 300, a service provider front-end web server 302, and a service provider back-end database 304. The described functions include a Register Account function 306, a Change Password function 308, and a Lost Password function 310. The Register Account function 306 is the technique used by an end user to obtain an authorized user account, as described above. This function associates the RSA key pair with the account, as has been described. The relevant account data (for the authorized end user and his or her account) is then stored in the database. The user password itself, however, is not stored persistently by the service provider (although it is available in-memory as needed). Rather, the database stores enc_acc_key (the value), rsa_pub_acc_key (the account public key) and the user's e-mail address (or other identifier). The end user may change his or her password using the Change Password function 308 as illustrated but, once again, the new password is never stored in the database 304. Rather, only the value is updated and stored. In addition, in the event the end user loses or forgets his or her password, the security model enables the Lost Password function 310 to enable the end user to create and enable use of a new password; however, once again the new password is not stored in the database. Rather, only the value gets updated.

Figure 4A:
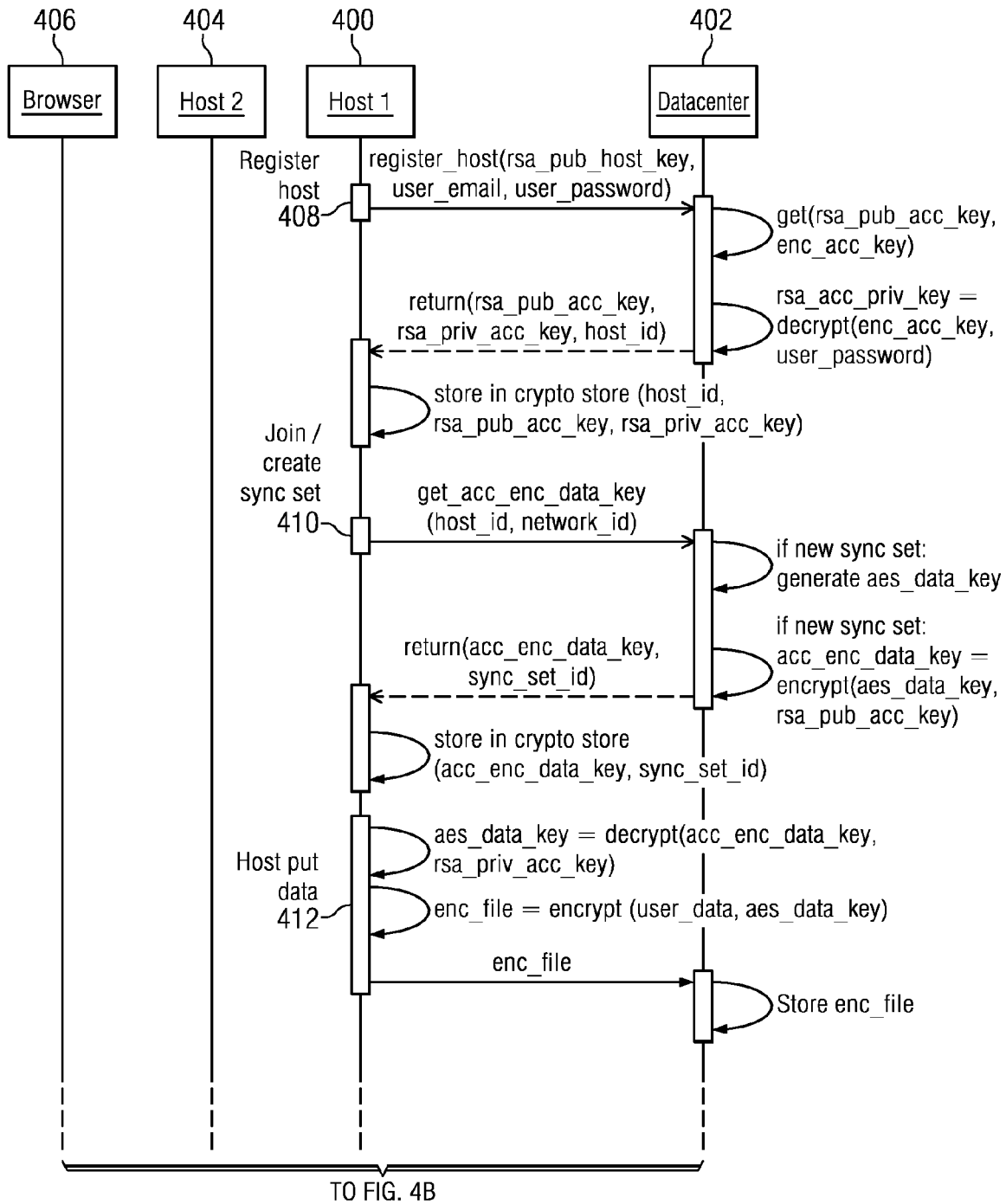
FIG. 4A and FIG. 4B together illustrate a UML interaction diagram of representative host computer interactions with the service provider cloud.
Figure 4B:
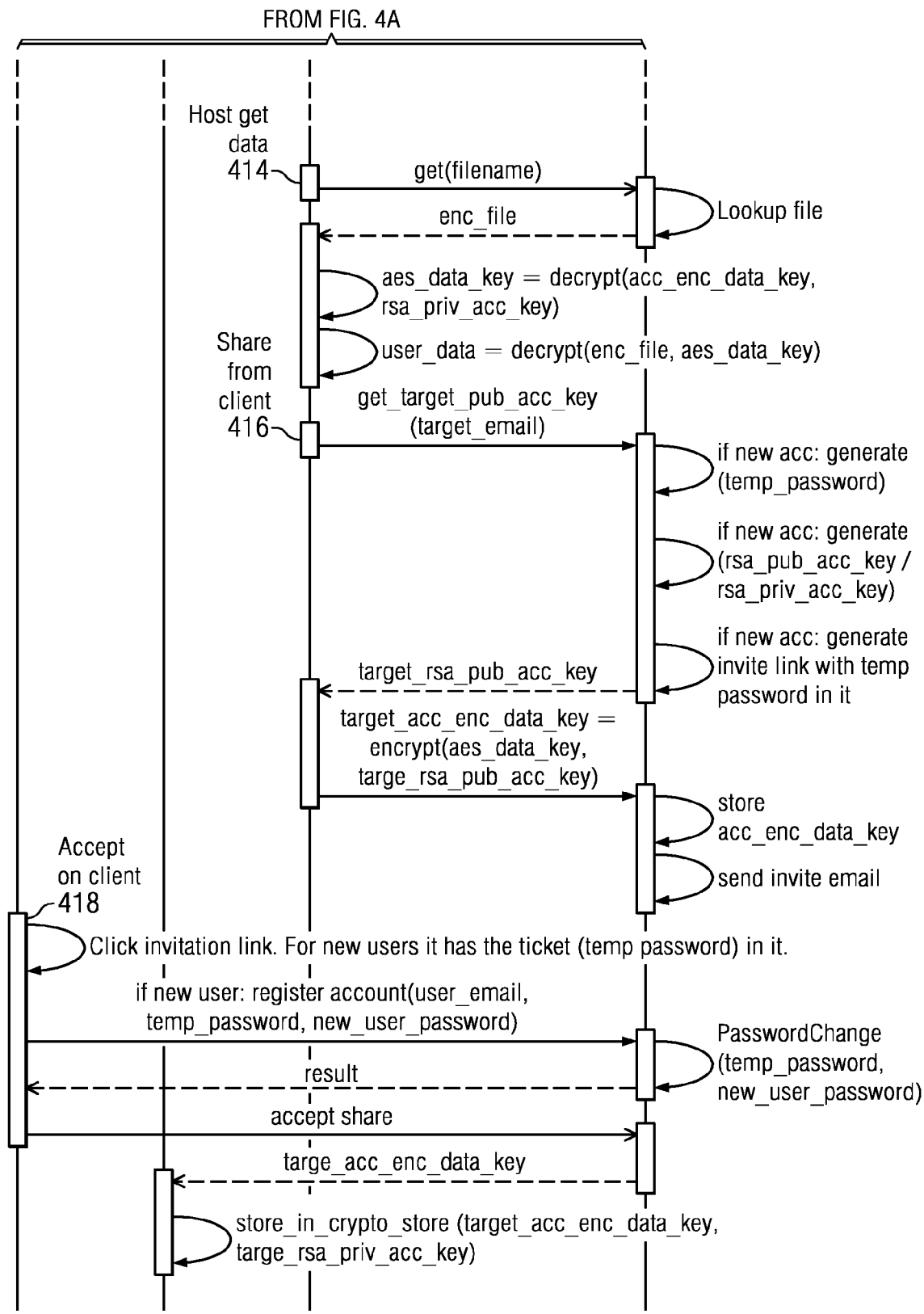

FIG. 4 is a UML interaction diagram illustrating representative interactions among a first host 400, a service provider data center machine 402, a second host 404, and an associated browser 406. Each of the first and second hosts 400 and 404 operate a remote access application provided by the service provider. Each host also includes a cryptographically-secure data store (or "crypto-store"). In this example scenario, the browser 406 executes on a client machine of a third party, and the third party may or may not be a subscriber to the service but will be invited to access or view data associated with an authorized user account. If the third party is a subscriber, typically he/she will have an associated host, which in this example corresponds to the second host 404. Each host machine has its own associated public/private key pair with the service provider.

As illustrated, the described functions include a Register Host function 408, a Join/Create Sync Set function 410, a Host Put Data function 412, a Host Get Data function 414, a Host Share function 416, and an Accept Invite function 418. The Register Host function 408 is used to register the host machine with the service provider. As a result, the service provider provides various pieces of information to the host including the account public key, the account secret key, and a host identifier, which the host then stores in the associated crypto-store. The Join/Create Sync Set function 410 is the function by which the host makes a request to the service provider to create a new synchronization set or to join an existing synchronization set (as stored in the cloud or other data storage). Typically, a "sync" set is created whenever it is desired to have a data set stored in the cloud and then replicated across one or more additional hosts for data integrity purposes. In other words, synchronization performs replication of the file across a set of machines. The synchronization process is implemented using a distributed real-time file synchronization application that ensures selected folders always have identical content on all participating computers. This application is merely illustrative, as the technique described herein may be used to secure any subscriber data on one or multiple machines.

Using the Join/Create Sync Set function 410, the host obtains the account secret key, which it saves in the associated crypto-store. This is step 206 in FIG. 2. The Host Put Data function 412 is used to store the subscriber data in the cloud, as previously described. This function corresponds to steps 210 and 212 in FIG. 2. The file is stored by the host making an HTTP PUT request. The Host Get Data function 414 is used to enable the host machine to obtain access to data from storage. To this end, the host makes an HTTP GET request to the data center, passing in the name of the file. The file is returned to the host, which then performs the identified decryption operations to obtain access to the user data. The Host Share function 416 is used to enable the host to generate an invitation (and, in particular, an invitation link) to access the user data and to send that invitation to the client browser 406. The invitation link includes a temporary password that is preferably a one-time use password. The client browser 406 executes the Accept Invite function 418 to obtain access to the user data by the invitee clicking on the invitation link. If the invitee is not a user of the service, the new user is first directed to register with the service, after which a password change is effected to substitute the invitee's password for the temporary password. The invitee then obtains and stores (in its associated host 404 crypto-store) the key information that is necessary to enable acceptance of the (first) user's share invitation.

Figure 5:
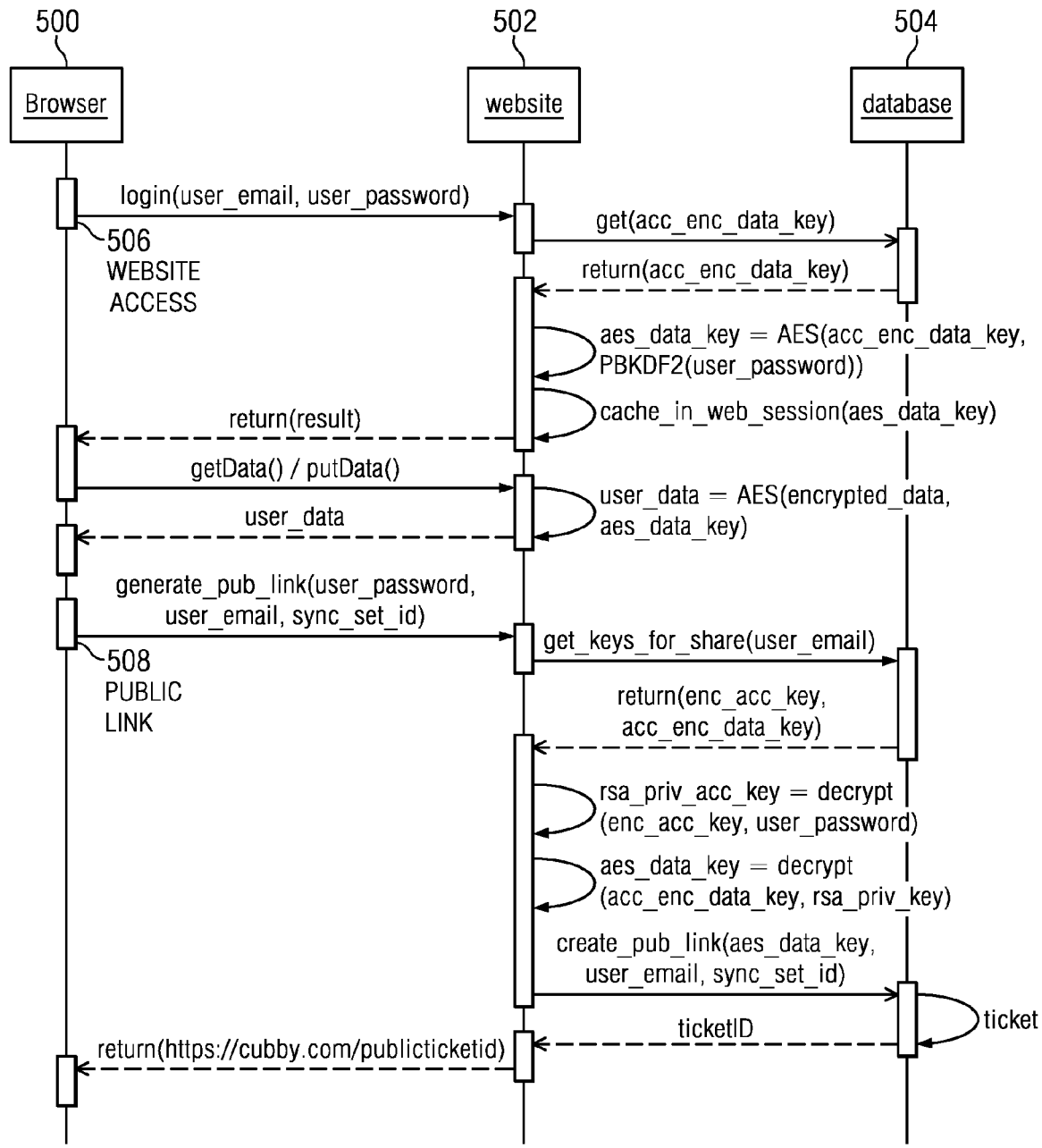
FIG. 5 depicts a UML interaction diagram of representative service provider website interactions.

FIG. 5 is a UML interaction diagram illustrating representative interactions among a client browser 500, the service provider web server 502, and the server provider back-end database 504 to facilitate public access to the user data. An Access function 506 is the operation by which the end user obtains access to his or her data that has been stored (and possibly replicated by the distributed synchronization application). To this end, the end user logs into the service and provides the user-specific secret, namely, the user password that is not stored in the service provider database. Steps 222 and 224 (of FIG. 2) are then carried out to enable the browser to obtain access to the desired user data. The Public Link function 508 provides an alternative technique by which the browser can request and obtain a public link token (or "ticket") that can be shared and used to access the user data.

The above-described technique provides significant advantages. Because the end user password is never stored persistently by the service provider, the service provider cannot access the user's data on its own. Only upon receipt of the user password it is possible to decrypt and obtain the data key that is used (in the first instance) to encrypt the data itself. The data is not available in the clear in the service provider environment, and additional mechanisms are provided to facilitate sharing (both private and public) while still maintaining the above-described security paradigm. When access to the end user data is required, the user password is available (but only in-memory), thus ensuring that the user-specific secrets are never exposed to the service provider.

Variants

With suitable security in place, it may be desirable to generate the key pair (the account public key and the associated account secret key) on the client.

The encrypting of the account secret key with the user password may involve additional steps. Thus, in the case where it is desired to use shorter key lengths on the client, the account secret key may be encrypted first using a shorter key length AES key, with the result being encrypted by the user password.

In appropriate circumstances, such as where the unauthorized user only accesses his or her files via the Web, it is not necessary to provide the authorized user (or any software being run thereby) with the account secret key.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The invention claimed is:

1. A service provider cloud apparatus, comprising:
at least one hardware processor;
computer memory holding computer program instructions executed by the processor to store and protect user data in the service provider cloud by:
storing a value that has been generated by encrypting an account secret key with a user-specific secret, the value being distinct from an account public key and the associated account secret key, the account secret key and the account public key comprising a key pair uniquely associated with an account of an authorized user;
storing a file that has been generated by encrypting data associated with the authorized user with a data key;
storing an account encrypted data key, the account encrypted data key having been generated by encrypting the data key with the account public key; and
providing access to the data associated with the authorized user upon receipt of the user-specific secret by the following ordered operations: (i) decrypting the value to obtain the account secret key, then (ii) decrypting, using the account secret key so obtained, the account encrypted data key to obtain the data key, then (iii) decrypting, using the data key so obtained, the file.

2. The apparatus as described in claim 1 wherein the data key is a symmetric key.

3. The apparatus as described in claim 1 wherein the key pair is an RSA public/private key pair.

4. The apparatus as described in claim 1 wherein the key pair is associated with the account of the authorized user upon registration of the authorized user to use the service provider cloud.

5. A method to store and protect user data in a service provider cloud, comprising:
storing a value that has been generated by encrypting an account secret key with a user-specific secret, the value being distinct from an account public key and the associated account secret key, the account secret key and the account public key comprising a key pair uniquely associated with an account of an authorized user;
storing a file that has been generated by encrypting data associated with the authorized user with a data key;
storing an account encrypted data key, the account encrypted data key having been generated by encrypting the data key with the account public key; and
providing access to the data associated with the authorized user upon receipt of the user-specific secret by the following ordered operations executed in a computing machine having a hardware element: (i) decrypting the value to obtain the account secret key, then (ii) decrypting, using the account secret key so obtained, the account encrypted data key to obtain the data key, then (iii) decrypting, using the data key so obtained, the file.

6. The method as described in claim 5 wherein access to the data is provided without exposing the user-specific secret to at least one of: an invitee associated with the user, and publicly.

7. The method as described in claim 5 wherein the key pair is generated on a client device associated with the authorized user.

8. The method as described in claim 5 wherein the data key is a symmetric key.

9. The method as described in claim 5 wherein the key pair is an RSA public/private key pair.

* * * * *